United States Patent
Knoppert et al.

(10) Patent No.: US 11,347,307 B1
(45) Date of Patent: May 31, 2022

(54) SELF-ADJUSTING HEADSET

(71) Applicant: Dell Products L.P., Round Rock, TX (US)

(72) Inventors: Michiel Sebastiaan Emanuel Petrus Knoppert, Amsterdam (NL); Gerald Rene Pelissier, Mendham, NJ (US); Thomas Marcus Hinskens, Utrecht (NL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/171,979

(22) Filed: Feb. 9, 2021

(51) Int. Cl.
*G06F 3/01* (2006.01)
*G02B 27/00* (2006.01)
*G06V 40/19* (2022.01)

(52) U.S. Cl.
CPC ......... *G06F 3/012* (2013.01); *G02B 27/0093* (2013.01); *G06V 40/19* (2022.01)

(58) Field of Classification Search
CPC ....... A42B 3/324; G06F 1/163; G06F 1/1679; G06F 3/011; G06F 3/013; G02B 27/0093; G02B 27/0172; G02B 27/0176; G02B 27/0179; G02B 2027/0129; G02B 2027/0138; G02B 2027/0181; G09G 5/38; G09G 2354/00
See application file for complete search history.

(56) References Cited

U.S. PATENT DOCUMENTS

| | | | |
|---|---|---|---|
| 5,954,642 A * | 9/1999 | Johnson | G06F 3/011 600/300 |
| 2013/0169683 A1* | 7/2013 | Perez | G06F 3/013 345/633 |
| 2018/0165942 A1* | 6/2018 | Hoshino | G09G 3/001 |
| 2021/0063754 A1* | 3/2021 | Lee | G09G 3/2092 |
| 2021/0067764 A1* | 3/2021 | Shau | A41D 13/1161 |
| 2021/0080996 A1* | 3/2021 | Hudman | G06F 1/1679 |

* cited by examiner

*Primary Examiner* — Nelson M Rosario
(74) *Attorney, Agent, or Firm* — Terrile, Cannatti & Chambers, LLP; Emmanuel A. Rivera

(57) ABSTRACT

A system, method, and computer-readable medium are disclosed for performing adjustments on a virtual reality (VR) headset. A user preference is determined as to a clamping force and an interpupillary distance (IPD) as applied to the VR headset. The user preferences are stored in a unique user profile. Adjustments are performed on the VR headset as to clamping force and IPD.

20 Claims, 12 Drawing Sheets

US 11,347,307 B1

SELF-ADJUSTING HEADSET

BACKGROUND OF THE INVENTION

Field of the Invention

The present invention relates to headset devices. More specifically, embodiments of the invention relate to a self-adjusting virtual reality (VR) headset.

Description of the Related Art

Headset devices, and particularly virtual reality (VR) headsets, that are used in environments such as offices, laboratories, and households, can have different users. Different users have varying size heads, eye spacing (i.e., interpupillary distance or IPD), and comfort levels, which are unique to each individual user. Therefore, to maximize the use and performance of a headset, the ability to make adjustments should be provided for individual users. Typically, such VR headsets, have limited adjustability to accommodate different users.

VR headsets that may have adjustable features may require each user to adjust and set/reset a headset, and specifically commonly used headsets. Typically, headset adjustment are performed manually. A user may manually adjust the band around the headset for the size of their head. A VR headset may allow for manual adjustment for a user's left eye and right eye for different user IPD.

When an adjustable VR headset is commonly used by multiple users, whenever the VR headset is used by a different user, headset settings or adjustments are changed for the particular individual user. Depending on the settings that are available for the VR headset and the ease of adjusting the settings, changing the adjustments of the VR headset for a different user can take considerable time and effort.

SUMMARY OF THE INVENTION

A system, method, and computer-readable medium are disclosed for performing adjustments on a virtual reality (VR) headset. A user preference is determined as to a clamping force and an interpupillary distance (IPD) as applied to the VR headset. The user preferences are stored in a unique user profile. Adjustments are performed on the VR headset as to clamping force and IPD.

BRIEF DESCRIPTION OF THE DRAWINGS

The use of the same reference number throughout the several figures designates a like or similar element. The present invention may be better understood, and its numerous objects, features, and advantages made apparent to those skilled in the art by referencing the accompanying drawings, wherein.

DETAILED DESCRIPTION

In various embodiments, a self-adjusting and self-regulating virtual reality (VR) headset is provided for different users. In various implementations, the VR headset has optical engines for the left eye and the right eye of a user. The optical engines project images to the user's left eye and right eye and create stereo-optical virtual images. The optical engines can include cameras that take images of a user's eyes (i.e., pupil/iris). The cameras can be adjusted per particular ergonomic settings for individual users and can be used to identify a user and for interpupillary distance (IPD).

Various implementations provide for adjustments as to clamping force applied to ear cups of the VR headset. The force at the ear cups is related to comfort preference of a particular user. Furthermore, other user defined preferences, such as audio volume and optical engine projection brightness level can be adjusted and set for specific users.

In certain implementations, using sensor feedback, user adjustments are performed on the VR headset. Implementations can provide for built-in eye tracking camera(s) control alignment of optical engines, including cameras of the optical engines. Built-in sensors of the VR headset can control clamping force of ear cups which exert pressure on the head. Input from sensors can be used to drive electromechanical adjustments of the VR headset.

Implementations can provide that when the VR headset is picked up by a user, the VR headset is initiated. An accelerometer on the VR headset can detect when the VR headset is picked up. In various implementations, the VR headset is activated when a user is recognized. The activation can be performed based on recorded user information found in stored user profiles. Implementations provide that when a user initially uses the VR headset, an iris scan takes place. Cameras on the optical engines scan the user's left iris and right iris. The scanned iris data is unique to each user. Ergonomic adjustments can be made using controls on the VR headset. The ergonomic adjustments or preferences can include clamping force, and IPD of the user.

A user profile is created with the unique user iris data and the user ergonomic adjustments. The user profile is stored for future reference. Therefore, during subsequent uses, when a user places the VR headset on, an iris scan of the user occurs, and the user is recognized by the user's iris scan data. A positive iris scan pulls up the user profile and the user's preferences are performed on the VR headset.

Figure 1:
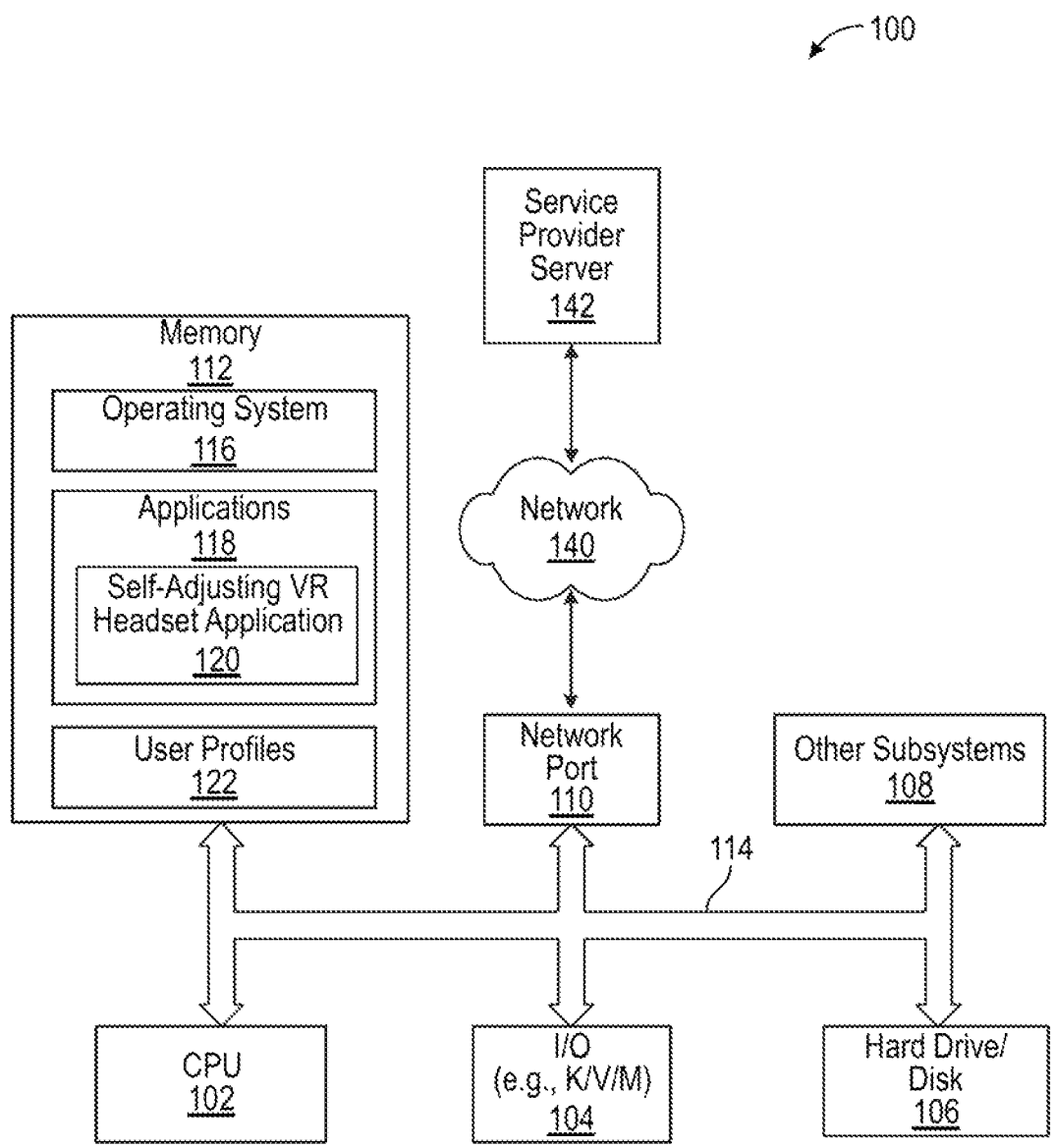
FIG. 1 depicts a general illustration of a computing system as implemented in the system and method of the present invention.

FIG. 1 illustrates an information handling system 100 that can be used to implement the system and method of the present invention. The information handling system 100 can be embodied as various computing and processing devices, such as a virtual reality (VR) headset, as described herein. The information handling system 100 can also be embodied as a source to or a controlling device of a VR headset. The information handling system 100 includes one or more processors (e.g., central processor unit or "CPU", embedded controller, etc.) 102, input/output (I/O) devices 104, such as a display, a keyboard, a mouse, and associated controllers, a hard drive or disk storage 106, and various other subsystems 108. In certain embodiments, a VR headset is included in subsystems 108.

In various embodiments, the information handling system 100 also includes network port 110 operable to connect to a network 140, which is likewise accessible by a service provider server 142. The network 140 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention. Implementations provide for wireless connection of the information handling system 100 to network 140 and other devices using technology such as Bluetooth.

The information handling system 100 likewise includes system memory 112, which is interconnected to the foregoing via one or more buses 114. System memory 112 further includes an operating system (OS) 116 and applications 118. In certain embodiments, applications 118 are provided as a service from the service provider server 142. Implementations can provide for applications 118 to include a self-adjusting VR headset application 120. The self-adjusting VR headset application 120 allows for methods described herein to be implemented. Various implementations can include for system memory 112 to store user profiles 122 which include one or more user profiles that include for example, user iris scan data and user ergonomic adjustment preferences, such as clamping force, IPD of user, audio volume, optical engine projection brightness, etc. In certain implementations user profiles 122 are stored in an external database (not shown).

Figure 2:
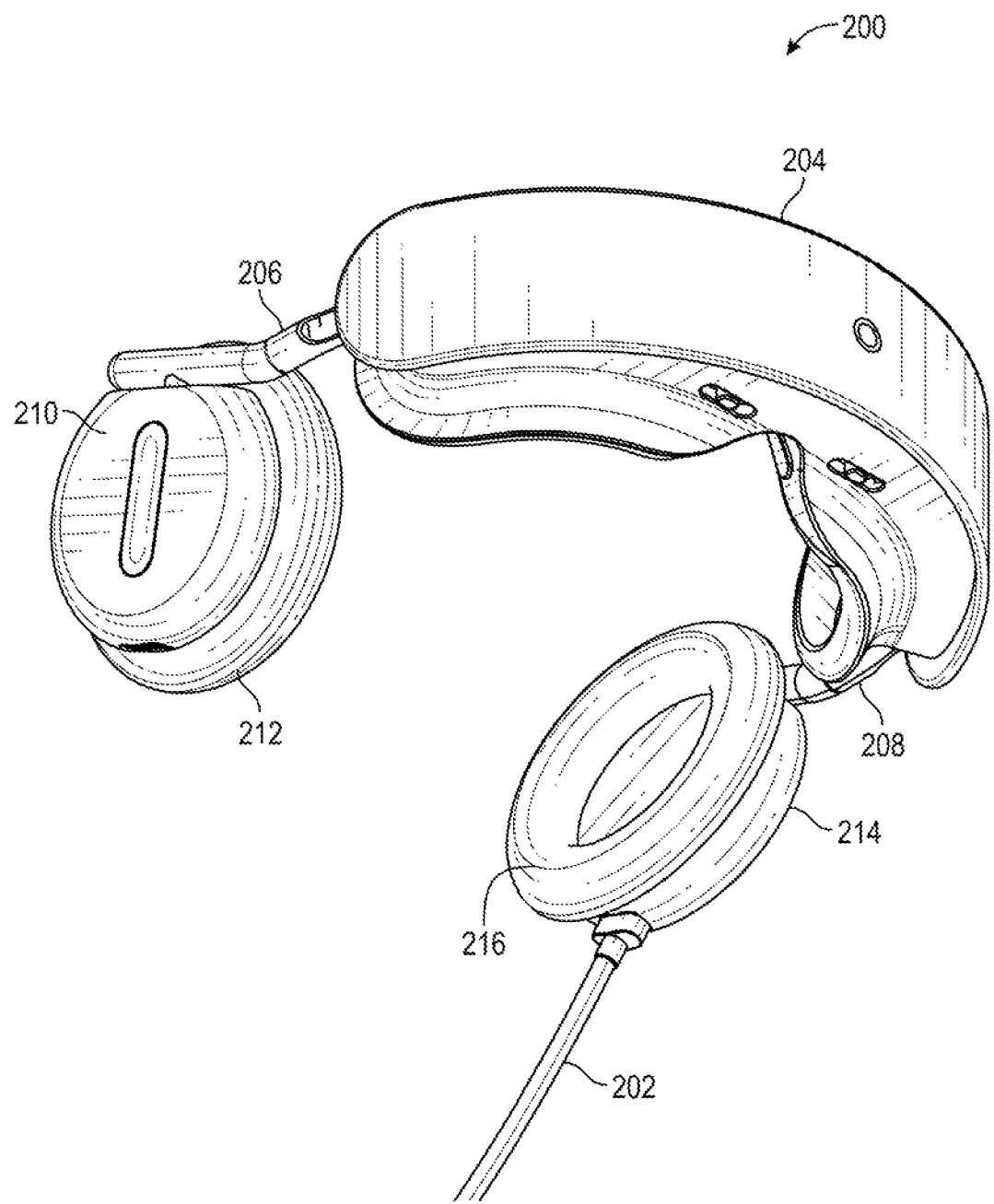
FIG. 2 depicts a bottom, front and right prospective view of a virtual reality headset.

FIG. 2 illustrates a bottom, front and right prospective view of a virtual reality (VR) headset. In certain embodiments, VR headset 200 is implemented as information handling system 100. Embodiments can provide that the VR headset 200 is connected to an information handling system 100 as another subsystem 108. Embodiments can provide that the VR headset 200 be implemented as I/O 104. For embodiments where VR headset is implemented as a subsystem 108 or I/O 104 a connection 202 can be provided to information handling system 100. Connection 202 can be wired or wireless (e.g., Bluetooth connectivity).

In various embodiments, the VR headset 200 is a constructed as "single band" that implements clamping forces to secure the VR headset 200 on a user's head and face. The "single band" provides for VR hardware and components and is used to support the VR headset 200 on a user. In contrast, typical VR headset devices implement a support band and a separate band that provides for the VR hardware and components.

In various embodiments, the "single band" is allowed to bend to a degree to adjust for clamping force, as further described herein. It is to be understood, that other embodiments can implement other bands, including separate support bands. The "single band" includes a housing unit 204 connected to a right support 206 and left support 208. Right support 206 is connected to a right ear support 210 which is connected to right ear cup 212. Left support 208 is connected to a left ear support 214 which is connected to a left ear cup 216.

In various embodiments, the VR headset 200 includes an accelerometer (not shown). In general, and well known in the industry, accelerometers are sensing devices that measure an object's acceleration and movement. In various implementations, an accelerometer of the VR headset 200 can indicated that the VR headset 200 is being picked up from a stationery position to be used by a user. Embodiments can also provide for sensors, which are further described herein, to be used to control clamping force of the ear cups 212 and 216.

Figure 3:
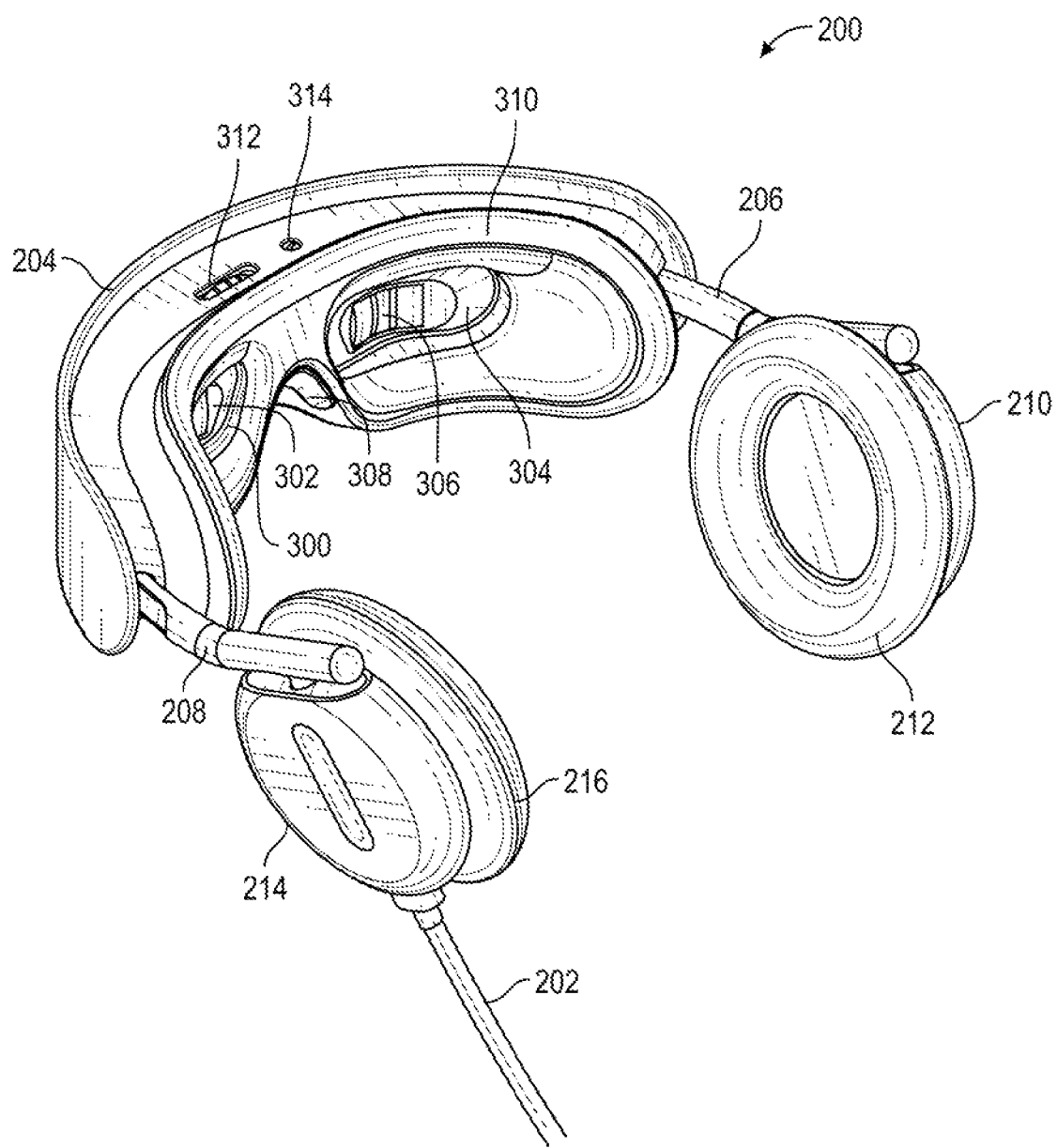
FIG. 3 depicts a top, back, and left prospective view of a virtual reality headset.

FIG. 3 illustrates a top, back, and left prospective view of the VR headset 200. Implementations provide for a left optical engine 300 that includes a camera 302, and a right optical engine 304 that includes a camera 304. A nose piece structure 308 is shown. Various implementations can also provide for a rear housing or cover 310 that protects hardware and components of the VR headset 200. Implementations can also provide for a control wheel 312 to adjust VR headset 200, and particularly clamping force adjustment of the VR headset 200. Additional controls and buttons, as represented by 314 can also be implemented.

Figure 4:
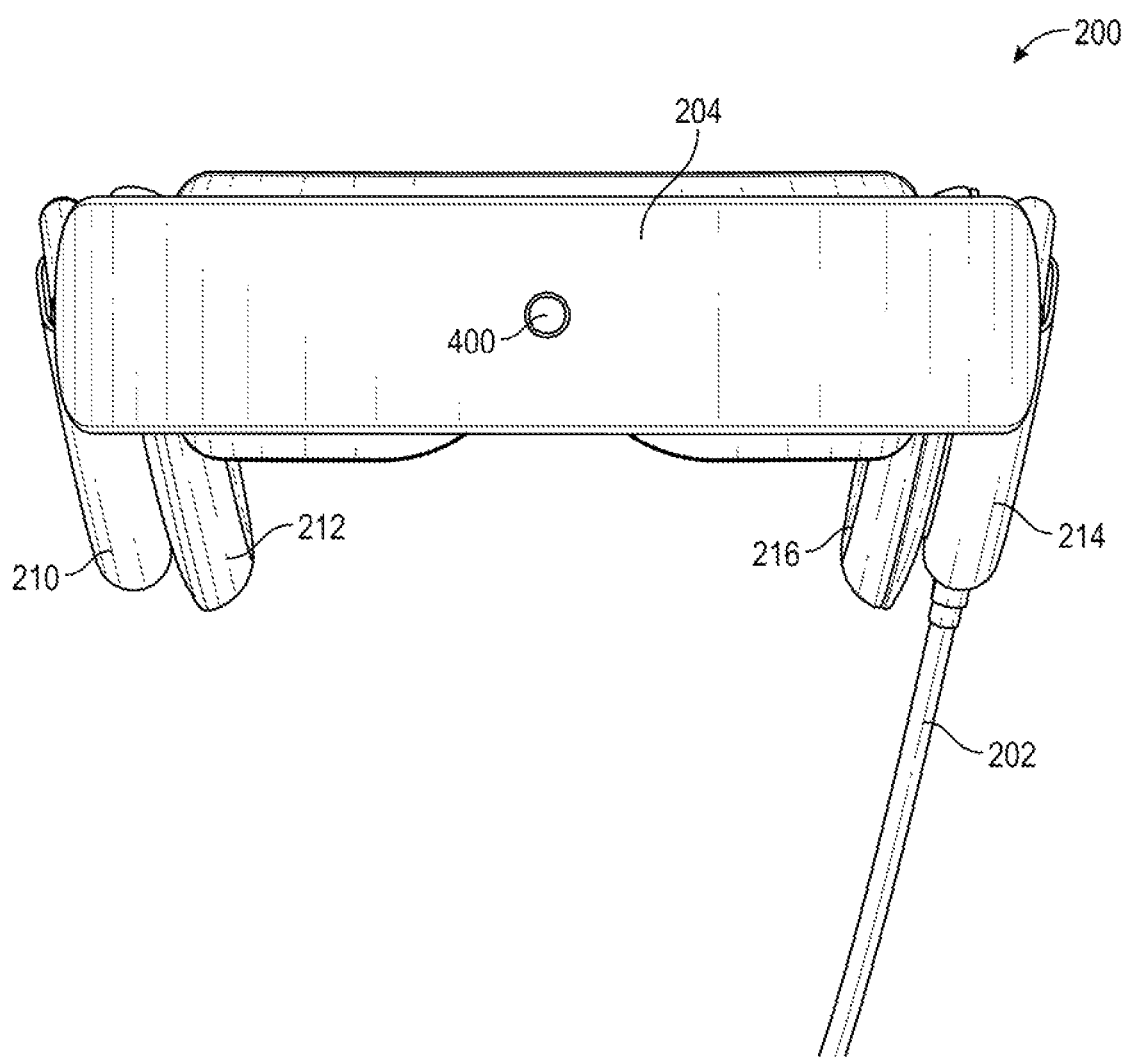
FIG. 4 depicts a front elevation view of a virtual reality headset.

FIG. 4 illustrates a front elevation view of the VR headset 200. Implementations can provide for a button or control, such as 400. The button 400 can be used in various implementations to turn on and off the VR headset 200.

Figure 5:
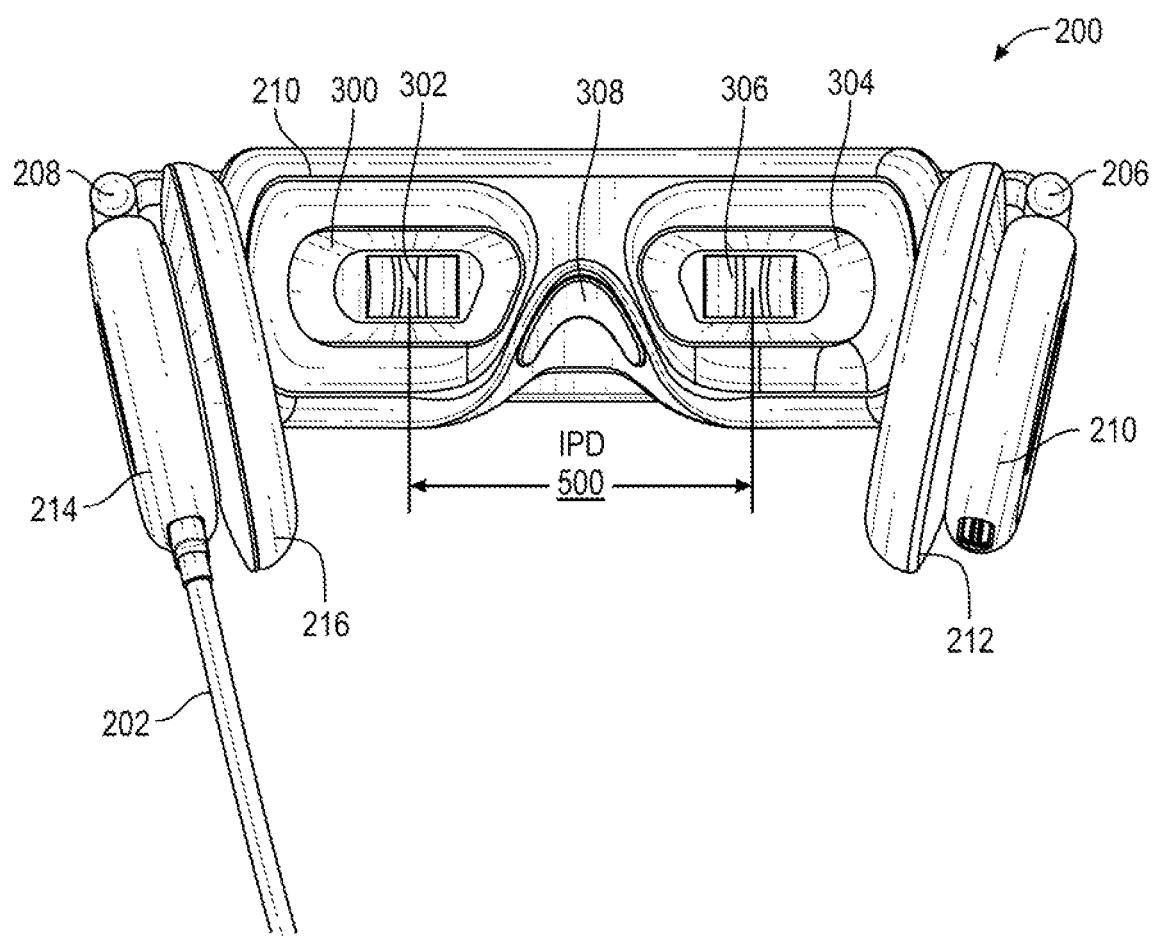
FIG. 5 depicts a rear elevation view of a virtual reality headset.

FIG. 5 illustrates a rear elevation view of the VR headset 200. Various implementations provide for the left eye camera 302 of optical engine 300 and right eye camera 306 of optical engine 304 to be used for eye tracking. Eye tracking can be used to determine an alignment of optical engines 300 and 304 with a user's pupil.

Figure 6:
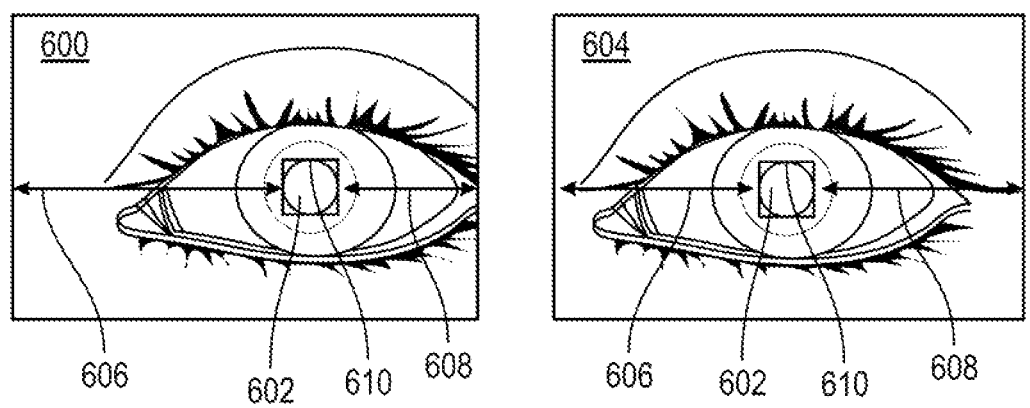
FIG. 6 depicts pupil alignment for a virtual reality headset.

Now referring to FIG. 6. FIG. 6 illustrates pupil alignment. Image 600 shows a pupil 602 that is misaligned with a camera (e.g., camera 302 or camera 304), and image 600 shows the pupil 602 that is aligned with the camera (e.g., camera 302 or camera 304). In particular, optical engines 300 and 304 are aligned to a user's pupils to properly project images. In misalignment, as shown in image 600, a distance 606 is unequal to a distance 608 as measured from a center 610 of pupil 602. In alignment, as shown in image 600, the distance 606 is equal to distance 608.

In certain implementations, when a pupil is detected by a camera (e.g., camera 302 or camera 304), an image is taken by the camera. The image from the camera can be used to control the alignment of optical engines with left and right pupils and determine the correct IPD for the user. In various implementations, when a pupil detected in the image, an IPD adjustment mechanism or electromechanical adjustment, further described herein, moves the optical engines 300 and 304 until there is an equal number of pixels of the image on both the left and right sides of the pupil.

Now referring back to FIG. 5, IPD 500 of the virtual headset 200 is the distance between the center of the optical engines 300 and 304, and their respective cameras 302 and 306.

Figure 7:
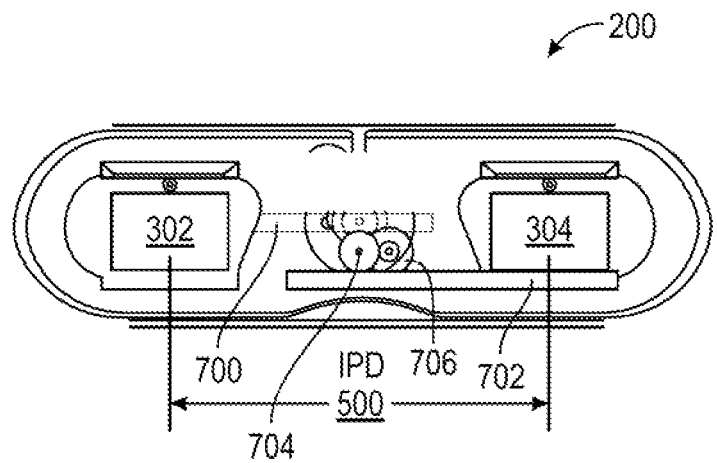
FIG. 7 depicts an adjustment mechanism for interpupillary distance of a virtual reality headset.

FIG. 7 shows an adjustment mechanism for IPD of the VR headset 200. In various implementations, a rack and pinion system is used to adjust for IPD 500. Optical engine 302 is attached to a support 700, and optical engine 304 is attached to a support 702. Supports 700 and 702, which can collectively be referred to as a "rack", are moved linearly using a gear 706. A motor 704 is provided input as to the amount of movement of the gear 706 and supports in relation to a particular IPD 500. In certain implementations, motor 704 is a stepper motor.

Figure 8:
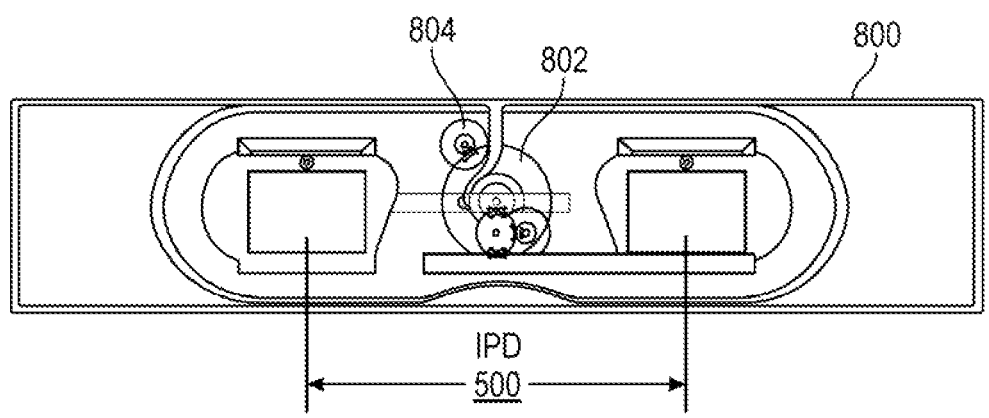
FIG. 8 depicts a retention system used for clamping force of a virtual reality headset.

FIG. 8 shows a wire retention system used for clamping force of the VR headset 200. The wire retention system is further described herein. In various implementations, a wire 800 is connected at ends of the "single band", such as anchor points on right support 206 and left support 208, as further described herein. A take up reel or wire retention wheel 802 is configured to pull in the wire 800 to increase clamping force or to let out the wire 800 to decrease clamping force. A motor 804 is provided input as to the amount of movement of the wire retention wheel 802 in relationship to the amount of clamping force is determined. In certain implementations, motor 804 is a stepper motor.

Figure 9A:
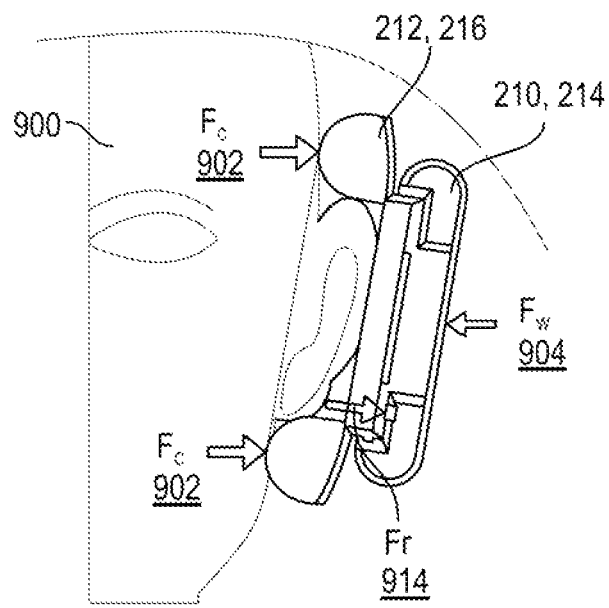
FIG. 9A depicts direct clamping force measurement using force sensors on earcups of a virtual reality headset.

FIG. 9A shows direct clamping force measurement using force sensors on earcups of the VR headset 200. When a user 900 places the VR headset 200, a head exerting reaction force Fc 902 is placed on the ear cups 212, 216, as the described wire retention system pushes on the ear cups 212, 216. The force of the wire retention system is represented by Fw 904.

Figures 9B, 9C:
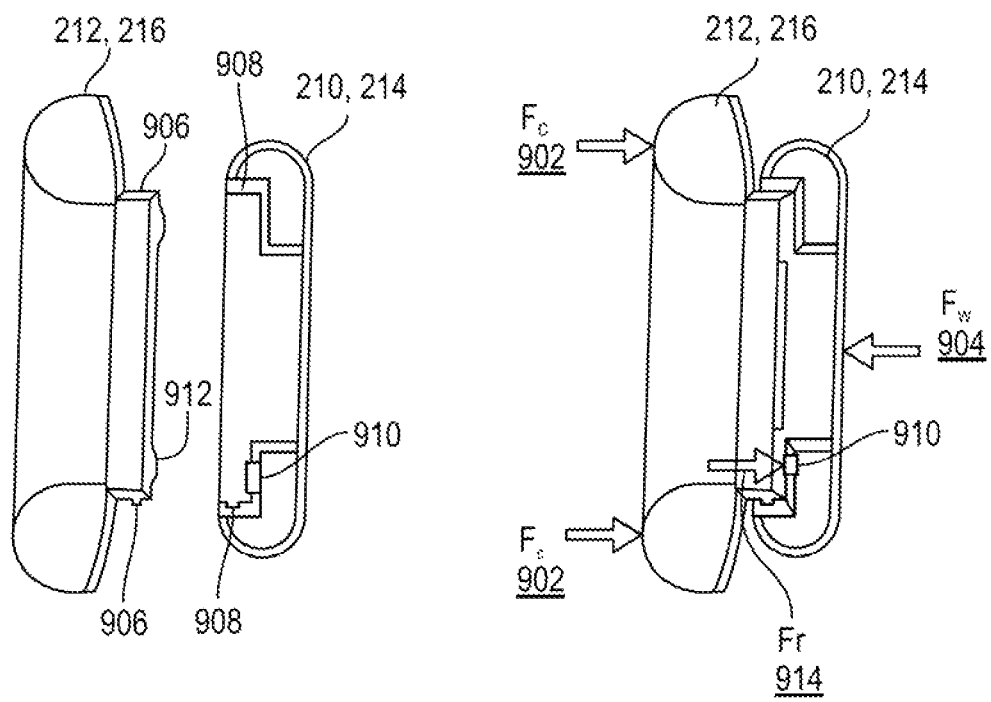
FIG. 9B depicts direct clamping force measurement using force sensors on earcups of a virtual reality headset.
FIG. 9C depicts direct clamping force measurement using force sensors on earcups of a virtual reality headset.

FIG. 9B further shows direct clamping force measurement using force sensors on earcups of the VR headset 200. In various implementations, a bayonet mechanism provides for indents 906 on the ear cups 212, 216 and openings 908 on the ear supports 210, 214. The indents 906 align with the openings 908 when the ear cups 212, 216 are integrated with the ear supports 210, 214. Implementations provide for the bayonet mechanism to allow the "single band" to pivot while user 900 wears the headset 200, such that the "single band" can be placed on top of the head of user 900 when not in use, and then pivot back to the face of user 900 when in use.

In order to measure control clamping force of the ear cups 212, 216, sensor feedback can be implemented. Various implementations provide for a printed force sensitive resistor 910 to be included in ear supports 210, 214. A bump 912 of the ear cups 212, 216 aligns with the force sensitive resistor 910. Force is then exerted and measured by the force sensitive resistor 910.

FIG. 9C further shows direct clamping force measurement using force sensors on earcups of the VR headset 200. In particular, FIG. 9B shows ear cups 212, 216 connected with respective ear supports 210, 214. When the exerting reaction force Fc 902 is applied on the ear cups 212, 216, a force Fr 914 is applied on the force sensitive resistor 910. The force sensitive resistor 910 provides a signal that can be used to adjust clamping force.

Figure 10:
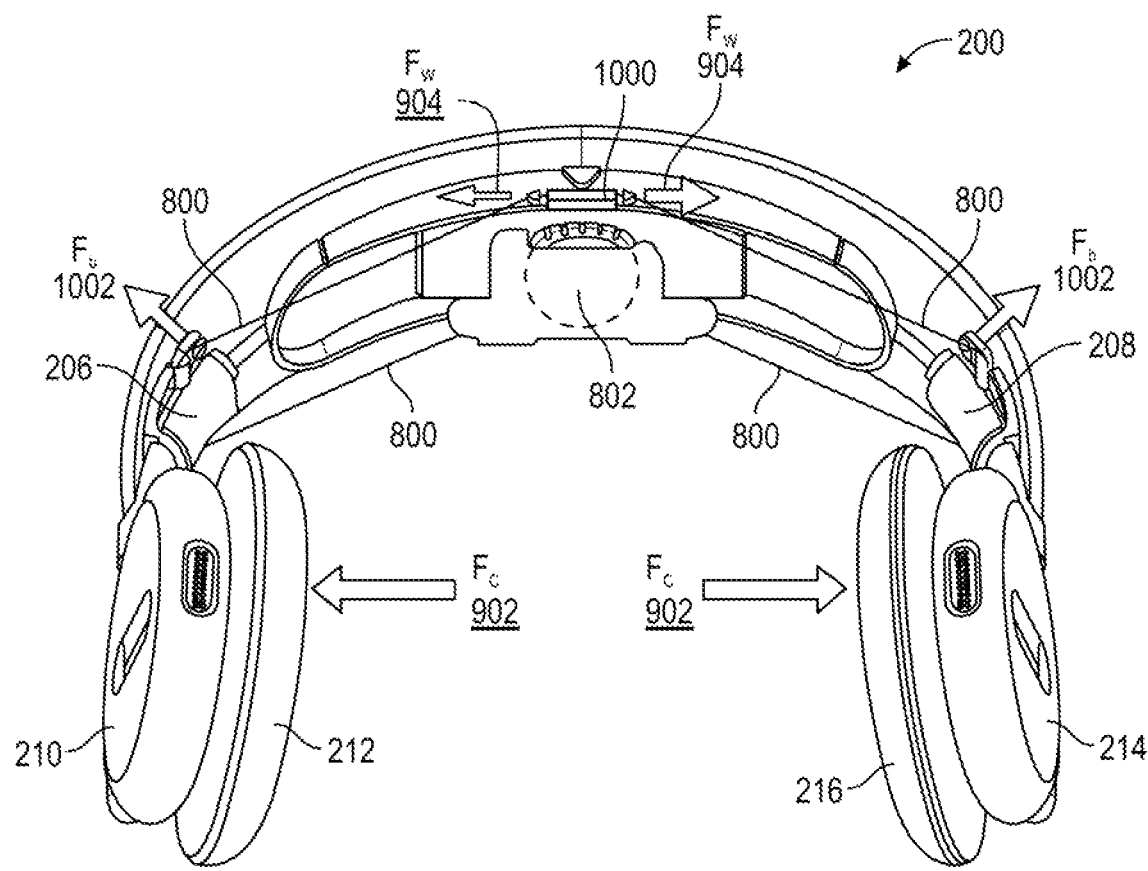
FIG. 10 depicts a bottom elevation view of a virtual reality headset and wire retention system.

FIG. 10 shows a bottom elevation view of the VR headset 200 and a wire retention system. In various implementations, wire 800 as described in FIG. 8 is attached or anchored at right support 206 and left support 208. Implementations include a continuous wire 800 that is taken up at wire retention wheel 802. Various implementations can provide for a strain gauge 1000 that is attached to ends of the wire 800. The strain gauge 1000 is configured to measure tension in wire 800 or Fw 904. Data derived from the strain gauge 1000 can be used to derive clamping force.

Fb 1002 represents a bending force of the "single band". Bending the "single band increases Fb 1002. Bending the "single band" increases the Fb 1002.

Figure 11:
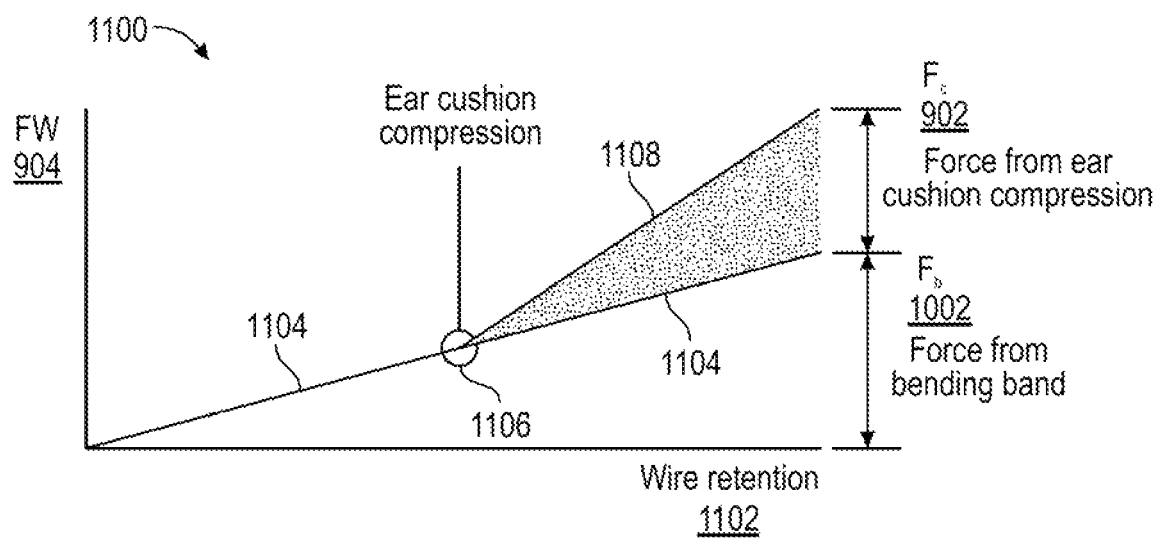
FIG. 11 shows a graph that plots wire retention against force against the wire retention system.

FIG. 11 shows a graph 1100 that plots wire retention 1102 vs. Fw 904. Without a user or head in place, Fw 904 of the virtual headset 200 is predictable during the winding of wire 800 in the wire retention system. This is represented by a linear plot 1104 with a constant slope. Bending the "single band increases Fb 1002 which increase Fw 904. The graph data can be used to derive clamping force.

With a user or head in place, at a certain point 1106, ear cushion compression occurs, and at a point 1106. Bending of the "single band" causing compression of the ear cups 212, 216. The force Fc 902 results in Fw 904 to build up faster as shown by an increase in slope of line 1108. In implementations that used a step motor as described in FIG. 8, for every step the motor makes, there can a give Fw 904 value. When, the wire retention system determines that the force due to ear up compression or Fc 902 reaches an acceptable or comfort level for the user, the wire retention system stops winding.

Figure 12:
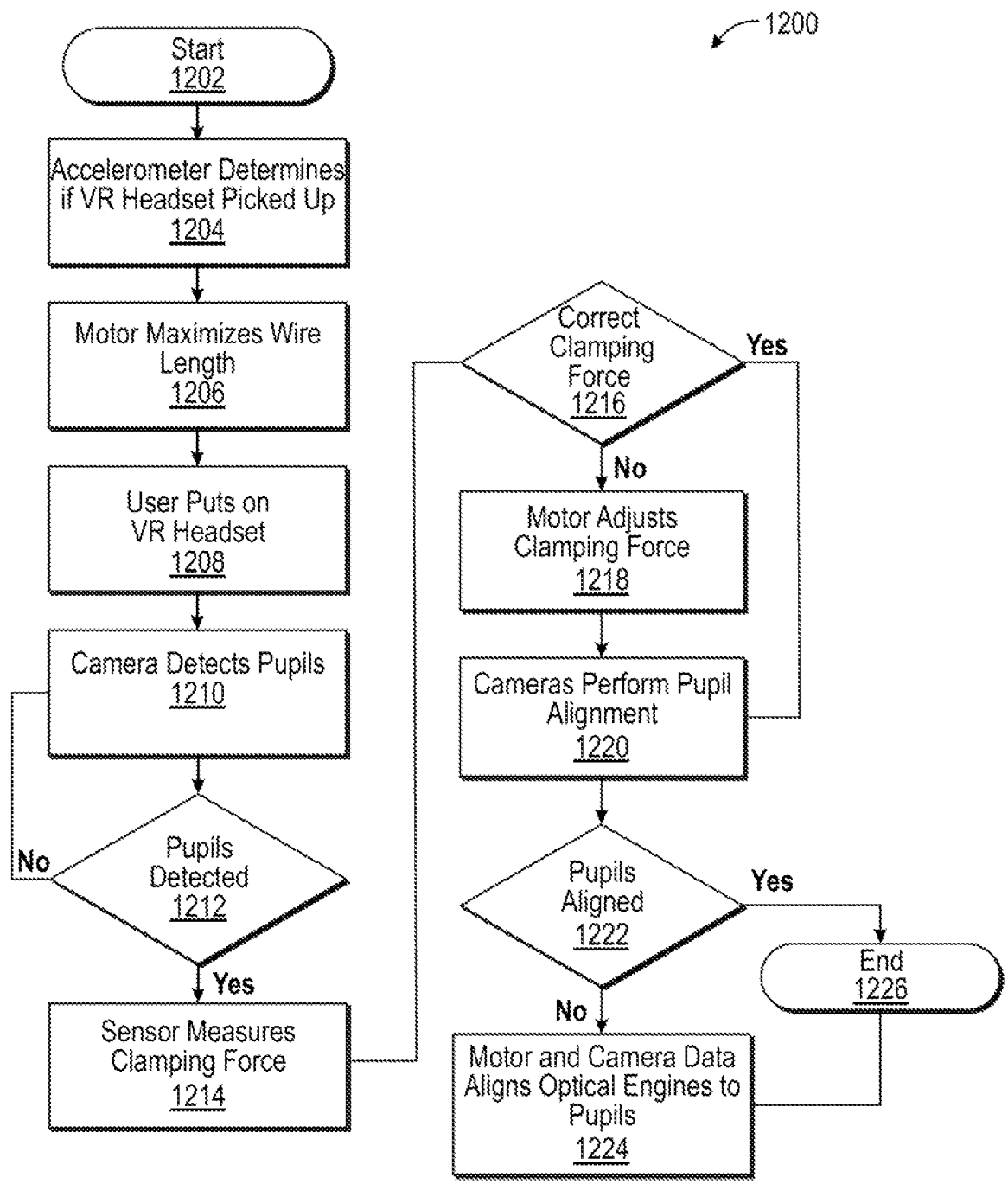
FIG. 12 shows a flow chart of an example scenario of using sensor data to control adjustment of a virtual reality headset.

FIG. 12 shows a flow chart of an example scenario of using sensor data to control adjustment of VR headset 200. The VR headset 200 senses force on a user's ears. Pupils are aligned to the optical engines 300, and clamping force adjustment is performed on the VR headset 200.

The flowchart 1200 illustrates one scenario; however, it is to be understood that other scenarios are possible for which the described VR headset 200 supports. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein.

At step 1202, the process 1200 starts. At step 1204, a determination is performed that the VR headset 200 has been picked up for use. Implementations can provide for an accelerometer in the VR headset to perform the determination, providing input back to a processor (e.g., CPU 102).

At step 1206, the motor 804 of the wire retention system of the VR headset 200 lets out wire 800 such that wire 800 is at a maximum length, allowing the "single band" of the VR headset 200 to be a maximum "opening." At step 1208, a user places the VR headset 200 on.

At step 1210, cameras 302, 306 of respective optical engines 300, 304 perform detection of user pupils. At step 1212, a determination is performed if the pupils are detected. If the pupils are not detected, following the "No" branch of step 1212, step 1210 is performed. If pupils are detected, following the "Yes" branch of step 1212, step 1214 is performed.

At step 1214, force sensitive resistor(s) 910 measures clamping force. The sensor data can be provided back to a processor (e.g., CPU 102) for use in adjusting the wire retention system.

At step 1216, a determination is performed as to correct clamping force of the wire retention system on VR headset 200. If the clamping force is not correct for the user, following the "No" branch of step 1216, step 1218 is performed. Otherwise, if clamping force is correct for the user, following the "Yes" branch of step 1216, step 1220 is performed.

At step 1218, the motor 804 of the wire retention system of the VR headset 200 adjusts the clamping force, taking in or letting out the wire 800, as necessary. At step 1208, a user places the VR headset 200 on. In certain implementations, motor 804 is a stepper motor that provides for incremental adjustments/changes.

At step 1220, the cameras 302, 306 of respective optical engines 300, 304 perform pupil alignment to assure that pupils are centered or aligned. At step 1222, a determination is performed as to pupil alignment. If pupils are not aligned, following the "No" branch of step 1222, at step 1224, motor 706 of the rack and pinion system of VR headset 200 along with acquired camera data aligns the optical engines 300, 304 to user's pupils. If pupils are aligned, following the "Yes" branch of step 1222, at step 1226, the process 1200 ends.

Figure 13:
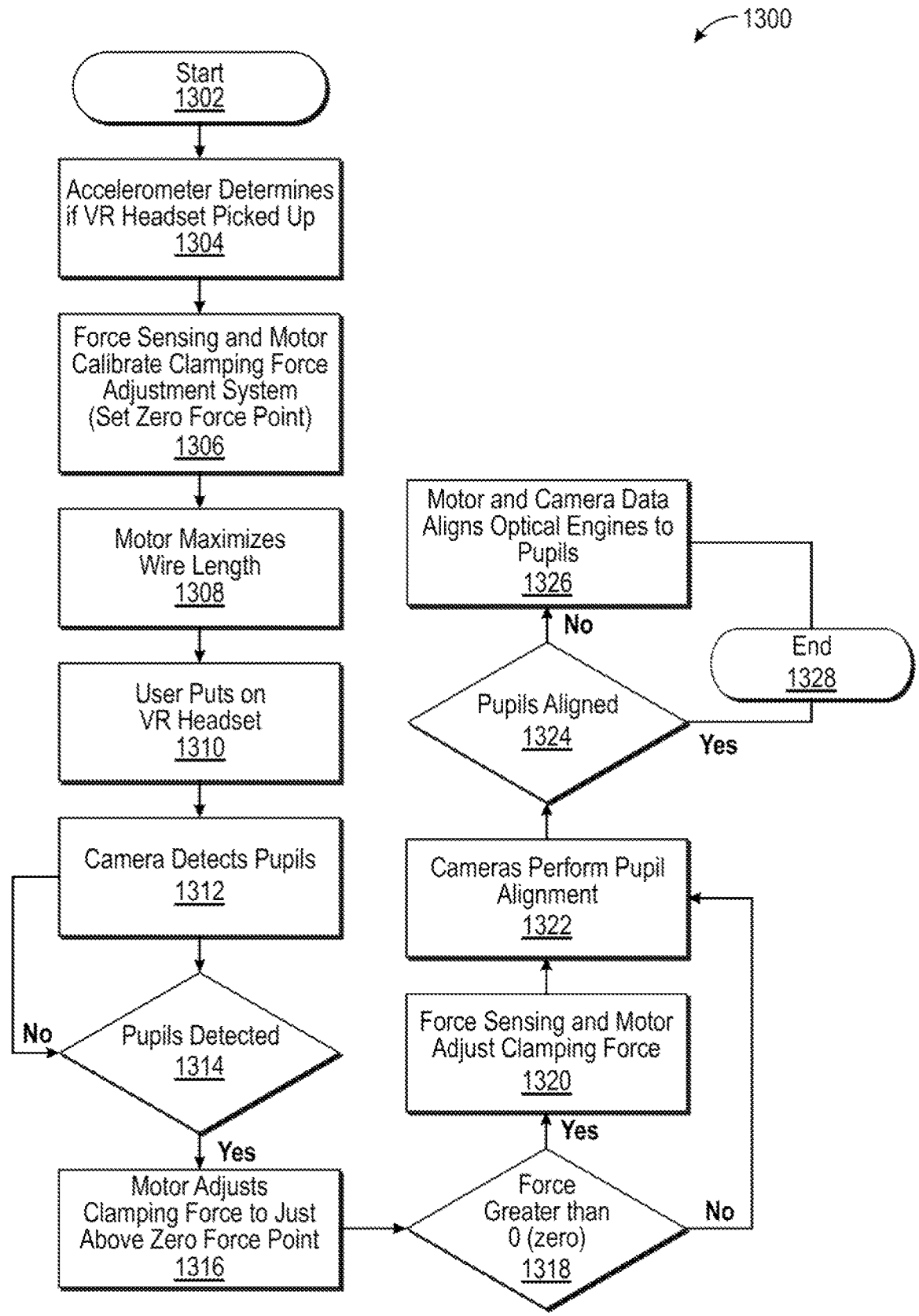
FIG. 13 shows a flow chart of an example scenario of using indirect clamping force measurement to control adjustment of a virtual reality headset.

FIG. 13 shows a flow chart of an example scenario of using indirect clamping force measurement to control adjustment of VR headset 200. The VR headset 200 senses force on a user's ears. Pupils are aligned to the optical engines 300, and clamping force adjustment is performed on the VR headset 200. Calibration steps prevent over clamping for extra large user heads. When pupils are detected, a clamping force goes to the a "just above zero force" position. A determination that the force is still remains at zero is related to the compression force caused by the "single band" alone is sufficient.

The flowchart 1300 illustrates one scenario; however, it is to be understood that other scenarios are possible for which the described VR headset 200 supports. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein.

At step 1302, the process 1300 starts. At step 1304, a determination is performed that the VR headset 200 has been picked up for use. Implementations can provide for an accelerometer in the VR headset to perform the determination, providing input back to a processor (e.g., CPU 102).

At step 1306, force sensitive resistor(s) 910 measures clamping force. The sensor data can be provided back to a processor (e.g., CPU 102) for use in adjusting the wire retention system. Motor 804 of the wire retention system of the VR headset 200 is set to a "just above zero force" or "zero force."

At step 1308, the motor 804 of the wire retention system of the VR headset 200 lets out wire 800 such that wire 800 is at a maximum length, allowing the "single band" of the VR headset 200 to be a maximum "opening." At step 1310, a user places the VR headset 200 on. In certain implementations, motor 804 is a stepper motor that provides for incremental adjustments/changes.

At step 1312, cameras 302, 306 of respective optical engines 300, 304 perform detection of user pupils. At step 1314, a determination is performed if the pupils are detected. If the pupils are not detected, following the "No" branch of step 1314, step 1312 is performed. If pupils are detected, following the "Yes" branch of step 1314, step 1316 is performed.

At step 1318, a determination is performed if clamping force of the wire retention system on VR headset 200 is greater than the zero force ("0"). If the clamping force is greater than zero force ("0"), following the "Yes" branch of step 1318, step 1320 is performed. Otherwise, if the clamping force is not greater than zero force ("0"), following the "No" branch of step 1318, step 1322 is performed.

At step 1320, the force sensitive resistor(s) 910 measures clamping force. The sensor data can be provided back to a processor (e.g., CPU 102) for use in adjusting the wire retention system. Motor 804 adjusts clamping force of the wire retention system of the VR headset 200.

At step 1322, the cameras 302, 306 of respective optical engines 300, 304 perform pupil alignment to assure that pupils are centered or aligned. At step 1324, a determination is performed as to pupil alignment. If pupils are not aligned, following the "No" branch of step 1324, at step 1326, motor 706 of the rack and pinion system of VR headset 200 along with acquired camera data aligns the optical engines 300, 304 to user's pupils. If pupils are aligned, following the "Yes" branch of step 1324, at step 1328, the process 1300 ends.

Figure 14:
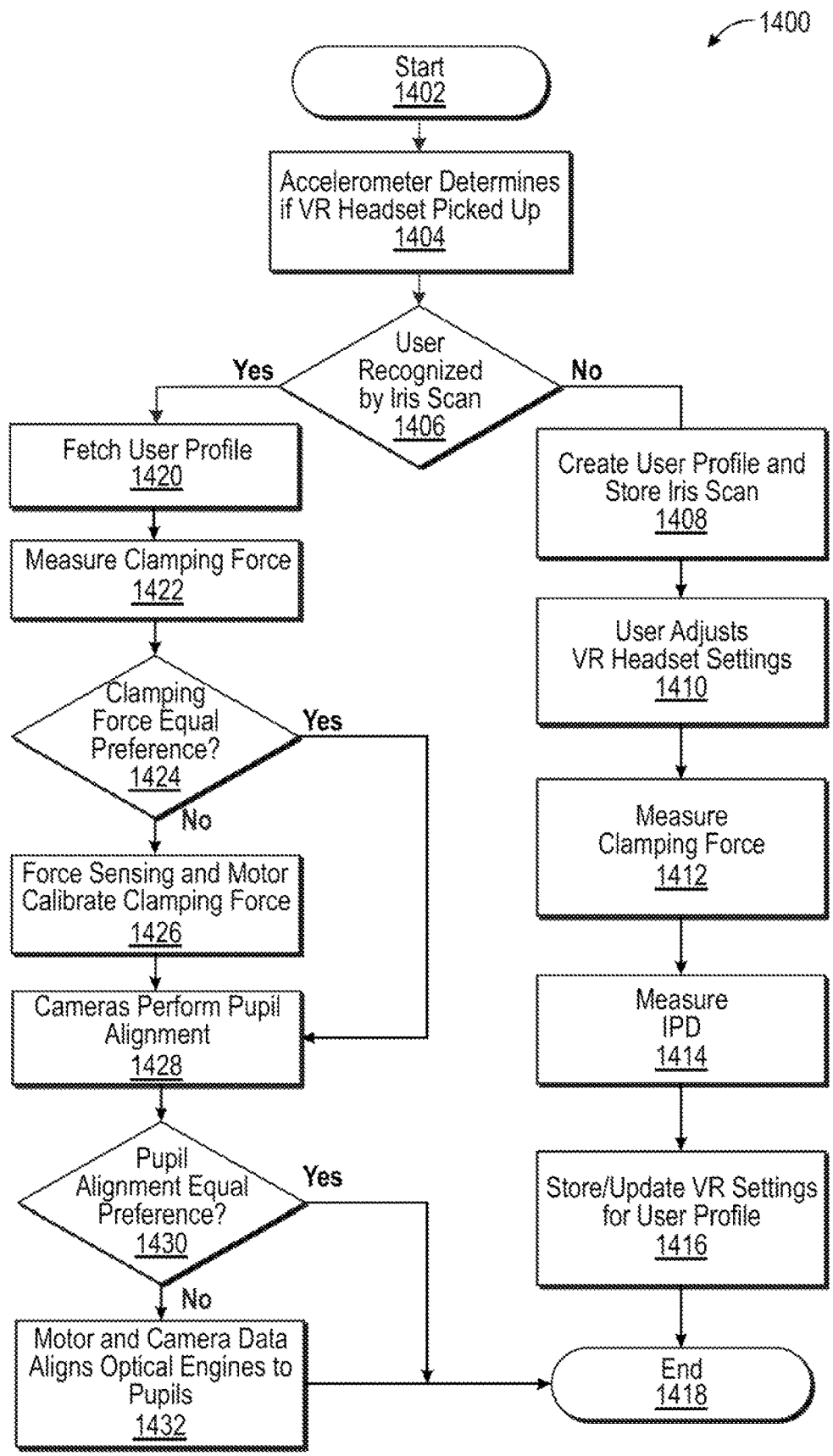
FIG. 14 shows a flowchart of an example of using user recognition and preferences to control the adjustment of virtual reality headset.

FIG. 14 shows a flow chart of an example scenario of user recognition and preferences are used to the control the adjustment of VR headset 200. A user defines their settings. A particular user is recognized, and their settings are applied to the VR headset 200.

The flowchart 1400 illustrates one scenario; however, it is to be understood that other scenarios are possible for which the described VR headset 200 supports. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein.

At step 1402, the process 1400 starts. At step 1204, a determination is performed that the VR headset 200 has been picked up for use. Implementations can provide for an accelerometer in the VR headset to perform the determination, providing input back to a processor (e.g., CPU 102).

At step 1406, an iris scan of a user is performed by cameras 302, 306 of respective optical engines 300, 304. A determination is made of the user. If a user's iris is recognized, the "Yes" branch of step 1406 is followed. If a user's iris is not recognized, the "No" branch of 1406 is followed. Recognition can be based on comparing the scanned iris to irises of user profiles 122. Implementations provide for user profiles 122 to be included in memory 122 and/or a database.

At step 1408, following the "No" branch of step 1406, a user profile is created with the iris scan of the user. This user profile can be in stored in user profiles 122. At step 1410, adjustments are made to VR headset 200 settings, as to user preferences. The user may implement buttons or controls on the VR headset 200. At step 1412, the force sensitive resistor(s) 910 measures clamping force. At step 1414, the cameras 302, 306 of respective optical engines 300, 304 measure IPD of the user. At step 1416, the user profile is stored/updated with the information determined at steps 1408 to 1414. At step 1418, the process 1400 ends.

At step 1420, following the "Yes" branch of step 1406, a user profile is fetched from user profiles 122 based on the iris scan of the user. At step 1422, the force sensitive resistor(s) 910 measures clamping force.

At step 1424 a determination is performed if clamping force is equal to the preference set in the user profile. If the clamping force is not equal to the preference set in the user profile, following the "No" branch" of step 1424, step 1426 is performed. At step 1426. At step 1426, the force sensitive resistor(s) 910 measures clamping force. The sensor data can be provided back to a processor (e.g., CPU 102) for use in adjusting the wire retention system. Motor 804 adjusts clamping force of the wire retention system of the VR headset 200.

At step 1428, the cameras 302, 306 of respective optical engines 300, 304 perform pupil alignment to assure that pupils are centered or aligned. At step 1430, a determination is performed as to pupil alignment and IPD user preference. If pupils are not aligned and IPD preference is not equal to the preferred IPD of the user profile, following the "No" branch of step 1430, at step 1426, motor 706 of the rack and pinion system of VR headset 200 along with acquired camera data aligns the optical engines 300, 304 to user's pupils. At step 1418, the process 1400 ends. If pupils are aligned and IPD is the preferred in the user profile, following the "Yes" branch of step 1430, at step 1418, the process 1400 ends.

Figure 15:
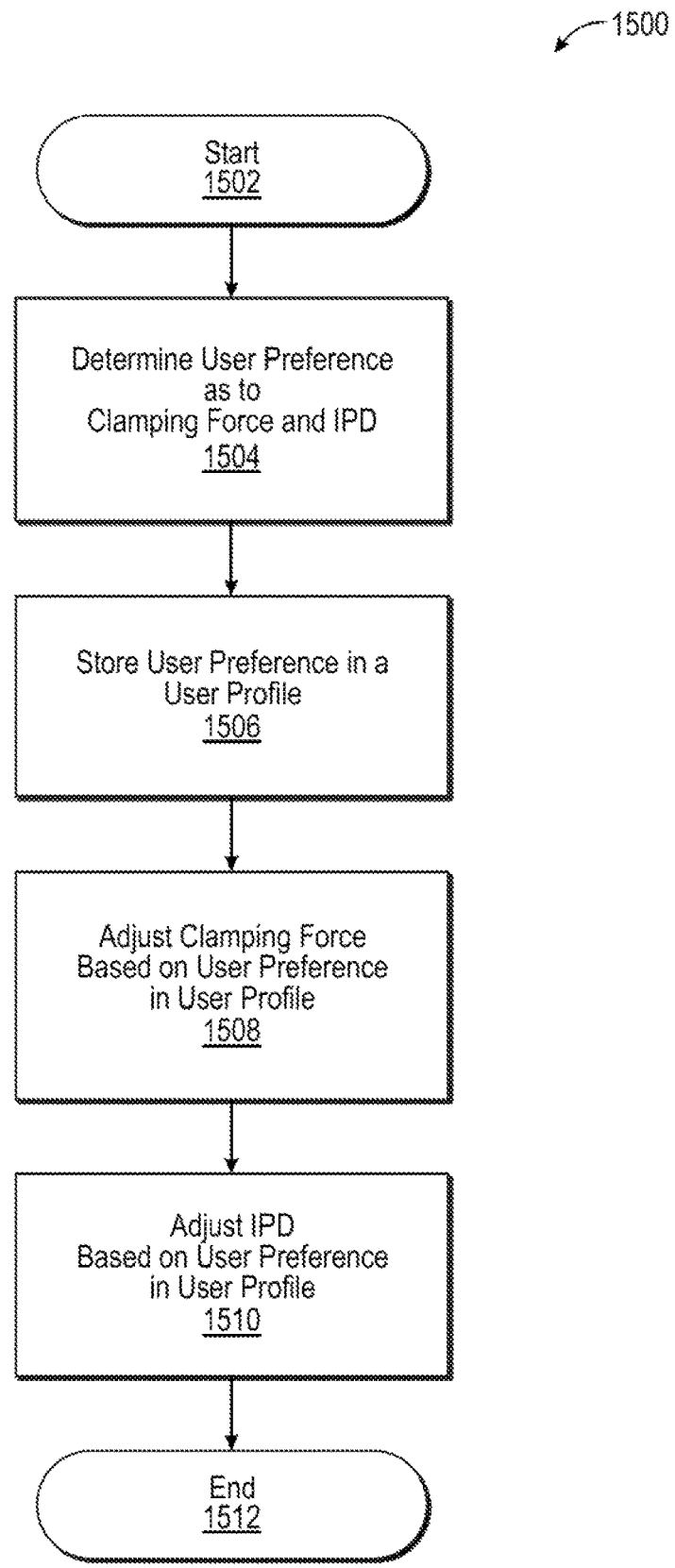
FIG. 15 shows a flow chart for providing adjustments to virtual reality headset.

FIG. 15 is a generalized flowchart 1500 for providing adjustments to VR headset 200. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 1502, the process 1500 starts. At step 1504, determination is made as to user preference regarding clamping force and IPD. In various implementations, the components and elements described herein can perform step 1504.

At step 1506, the preferences are stored in a user profile. The user profile can be fetched from memory or a database, and be included with other user profiles (e.g., user profiles 122). A unique iris scan can identify particular users and their user profiles.

At step 1508, clamping force is adjusted based on the user preference in the user profile. At step 1510, IPD is adjusted based on the user preference in the user profile. At step 1512, the process 1500 ends.

As will be appreciated by one skilled in the art, the present invention can be embodied as a method, system, or computer program product. Accordingly, embodiments of the invention can be implemented entirely in hardware, entirely in software (including firmware, resident software, microcode, etc.) or in an embodiment combining software and hardware. These various embodiments can all generally be referred to herein as a "circuit," "module," or "system." Furthermore, the present invention can take the form of a computer program product on a computer-usable storage medium having computer-usable program code embodied in the medium.

Any suitable computer usable or computer readable medium can be utilized. The computer-usable or computer-readable medium can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium can be any medium that can contain, store, communicate, or transport the program for use by or in connection with the instruction execution system, apparatus, or device.

Computer program code for carrying out operations of the present invention can be written in an object oriented programming language such as Java, Smalltalk, C++ or the like. However, the computer program code for carrying out operations of the present invention can also be written in conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through a local area network (LAN) or a wide area network (WAN), or the connection can be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method of performing adjustments on a virtual reality (VR) headset comprising:
   determining a user preference as to clamping force of the head of the user and interpupillary distance (IPD) of the VR headset;
   storing the user preference in a user profile in a system memory;
   pulling up the user profile from the system memory when an iris scan of the user is performed;
   adjusting the clamping force using a wire connected to a stepper motor of the VR headset; and
   adjusting the IPD of the VR headset.

2. The method of claim 1, wherein the user is identified by an iris scan performed by cameras integrated in the VR headset.

3. The method of claim 1, wherein the determining is based on adjustments performed on an initial use of the VR headset by the user.

4. The method of claim 1, wherein the adjusting the clamping force implements sensors, a wire retention system, and motor that increase the force of a wire on the wire retention based on the user preference.

5. The method of claim 1, wherein the IPD of the VR headset implements a rack and pinion system comprising a motor that adjust optical engines to align with pupils of the user based on IPD preference.

6. The method of claim 1 further comprising aligning pupils of the user when adjusting the IPD of the VR headset.

7. The method of claim 1 further comprising determining if the VR headset is picked up through an accelerometer.

8. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
      determining a user preference as to clamping force of the head of the user and interpupillary distance (IPD) of the VR headset;
      storing the user preference in a user profile in a system memory;
      pulling up the user profile from the system memory when an iris scan of the user is performed;
      adjusting the clamping force using a wire connected to a stepper motor of the VR headset; and
      adjusting the IPD of the VR headset.

9. The system of claim 8, wherein the user is identified by an iris scan performed by cameras integrated in the VR headset.

10. The system of claim 8, wherein the determining is based on adjustments performed on an initial use of the VR headset by the user.

11. The system of claim 8, wherein the adjusting the clamping force implements sensors, a wire retention system, and motor that increase the force of a wire on the wire retention based on the user preference.

12. The system of claim 8, wherein the IPD of the VR headset implements a rack and pinion system comprising a motor that adjust optical engines to align with pupils of the user based on IPD preference.

13. The system of claim 8 further comprising aligning pupils of the user when adjusting the IPD of the VR headset.

14. The system of claim 8 further comprising determining if the VR headset is picked up through an accelerometer.

15. A non-transitory, computer-readable storage medium embodying computer program code, the computer program code comprising computer executable instructions configured for:
   determining a user preference as to clamping force of the head of the user and interpupillary distance (IPD) of the VR headset;
   storing the user preference in a user profile in a system memory;
   pulling up the user profile form the system memory when an iris scan of the user is performed;
   adjusting the clamping force using a wire connected to a stepper motor of the VR headset; and
   adjusting the IPD of the VR headset.

16. The non-transitory, computer-readable storage medium of claim 15, wherein the user is identified by an iris scan performed by cameras integrated in the VR headset.

17. The non-transitory, computer-readable storage medium of claim 15, wherein the adjusting the clamping force implements sensors, a wire retention system, and motor that increase the force of a wire on the wire retention based on the user preference.

18. The non-transitory, computer-readable storage medium of claim 15, wherein the IPD of the VR headset implements a rack and pinion system comprising a motor that adjust optical engines to align with pupils of the user based on IPD preference.

19. The non-transitory, computer-readable storage medium of claim 15 further comprising aligning pupils of the user when adjusting the IPD of the VR headset.

20. The non-transitory, computer-readable storage medium of claim 15 further comprising determining if the VR headset is picked up through an accelerometer.

* * * * *